INVENTORS
WENDELL L. DARROW &
BY JOSEPH W. KASS

ATTORNEYS

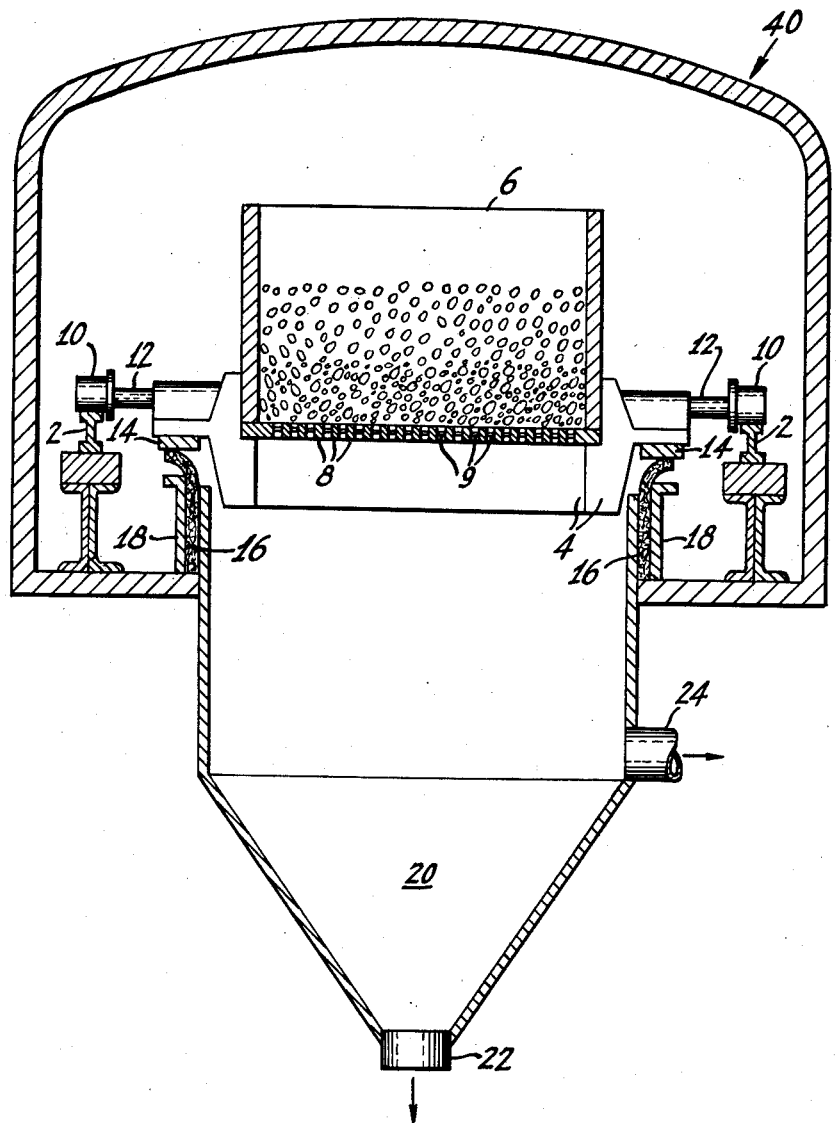

3,076,248
PROCESS FOR THE PRODUCTION OF CALCINED PHOSPHATE AGGLOMERATES
Wendell L. Darrow, Alameda, Idaho, and Joseph W. Kass, Kemmerer, Wyo., assignors to FMC Corporation, a corporation of Delaware
Filed Nov. 17, 1960, Ser. No. 69,933
6 Claims. (Cl. 25—156)

This invention relates to the production of calcined phosphate agglomerates, and particularly to the production of agglomerates which are especially suitable for furnace feed in the manufacture of phosphorus.

The phosphate ores obtainable in the western part of the United States are composed of large deposits of phosphate shale containing up to about 32% $P_2O_5$ in the form of calcium phosphate. These ores also contain silica, iron oxide, organic matter, clay, small quantities of chromium oxide and vanadium oxide, and from 2 to 4% shale oil. These ores are converted to phosphorus by reduction in an electric arc furnace.

Heretofore, calcined phosphate agglomerates, derived from phosphate shale and suitable for furnace feed, have been produced by crushing the above-described shale in a hammer mill into particulate form to pass a 4-inch screen, screening the shale into fine (—6 mm.) and coarse (¼ to 3″) fractions, treating the fines fraction by either briquetting or pelletizing using wet agglomeration, calcining the agglomerates and the previously separated coarse fraction in a rotary kiln, and screening objectionable fines out of the calcined product to yield a coarse nodule or calcined phosphate. The calcined fines, which are smaller than 6 mesh, are returned to the agglomeration step for further briquetting or pelletizing.

The operation of a rotary kiln in this process gives rise to serious difficulties. One of the principal difficulties encountered is the relatively low mechanical strength of the calcined phosphate product. As a result, the calcined phosphate agglomerates disintegrate into fines which must be screened out at the termination of the calcination process. These calcined fines are recycled to the agglomeration step, and represent a recycle load of at least 13% on the agglomeration equipment, and a recycle load of 10% on the rotary kilns. As a further result of the low mechanical strength of the calcined phosphate, additional fines in the amount of about 10 to 15% are formed after the initial screening of the kiln product. These unscreened fines enter the phosphorus furnaces along with the calcined phosphate nodules, and their presence in the furnace burdens creates a serious problem since they cause erratic furnace operation.

Rotary kilns are also objectionable because they require a low-temperature drying step to prevent green briquettes from spalling or breaking into pieces when exposed to the heating shock of the calcining temperatures employed. Additionally, under kiln conditions, fines which are released during calcination undergo rapid heating, partially melt, and adhere to the kiln surfaces. These agglomerates change the internal shape of the kiln, and finally form into balls which block the passage of air through the kiln. When this occurs, a shutdown for clean-out is required.

It is an object of the present invention to produce calcined phosphate agglomerates suitable for furnace feeds, having high strengths and containing reduced amounts of fines.

It is a further object to produce calcined phosphate agglomerates having high strength and freedom from fines, which do not require screening prior to their introduction into the phosphorus furnace.

It is an additional object to produce a calcined phosphate agglomerate by a process which minimizes dust losses.

It is a further object to produce a calcined phosphate agglomerate by a process which eliminates the need for low-temperature drying of the briquette feed to the calciner.

It has now been determined, quite unexpectedly, that phosphate agglomerates having high tumbling strengths and suitable for furnace feeds in the production of phosphorus can be produced by crushing phosphate shale containing minor amounts of shale oil (generally on the order of about 2 to 4%), screening the shale into a fines fraction which passes through a 6 mm. screen, and into a coarse lump fraction having a particle size of about ¼ to 3 inches in diameter, treating the fines by briquetting or pelletizing them in a wet agglomeration step, placing a portion of the coarse lump fraction on a non-agitated perforate carrier as an underhearth layer, placing an overlay layer of agglomerated fines and remaining lump fractions on the underhearth layer, and calcining the resultant bed for about 15 to 25 minutes. The calcination is performed by heating the agglomerates to temperatures between about 2250° to 2500° F. on the non-agitated, perforate carrier. The underhearth layer should comprise at least about 16% of the total bed depth.

It has further been determined that if the phosphate feed to be calcined consists only of briquettes or pellets, calcination may be performed using an underhearth layer of calcined product in lieu of the phosphate lump.

The exact reason for this increased tumbling strength over the phosphate agglomerates produced in a rotary kiln is not known, but it is probably due to the surface fusion of fine particles of oily shale which act as a natural binder to hold the individual feed particles together. This fusion can take place in the present process because the calcination is carried out upon a non-agitated carrier which gives the fine oily shale particles an opportunity to consolidate in place; the rotating kiln does not allow such undisturbed consolidation because of its tumbling operation. However, regardless of the reason, it has been determined that the non-agitated perforate carrier-type calciner produces phosphate agglomerates of significantly higher resistance to disintegration than does the tumbled bed of the rotated kiln.

The temperature of heating the phosphate feed is quite critical. Comparative data which was accumulated showed a significant correlation between the tumbling strengths and the maximum temperature of the bed layer. A graphic computation of this data is shown in FIGURE 1, wherein tumbling strengths are employed as ordinates, and maximum bed temperatures as abscissas. If we adopt as a satisfactory tumbling strength that which was obtained in the rotary kiln, i.e. greater than 83%, it is found that temperatures between about 2250° F. and 2500° F. produced calcined phosphate agglomerates having satisfactory tumbling strengths for use as furnace feeds. Temperatures above 2500° F. are not desirable because of excessive fusion of the product, rendering it difficult to work with. Additionally, heating costs become unduly high at temperatures above 2500° F.

The tumbling tests are made by tumbling 500-gram samples of the calcined product for ten minutes in a 14-inch diameter can, equipped with one 2½-inch radial lifter. The tumbler is rotated on a central axis at a speed of 45 r.p.m. Loss on tumbling is defined as the percent of the sample passing through a 6-mesh screen after tumbling; the percent remaining on the screen is the tumbling strength of the sample. This test is designed to show the physical strength of the calcined materials.

A specific non-agitated perforate carrier which may be employed in the practice of the invention is illustrated by way of example in the attached drawings. In the drawings, FIGURE 1 is the graph referred to above.

FIGURE 3 represents a cross-sectional view of the apparatus along line 3—3 of the calcining section.

Figure 1:
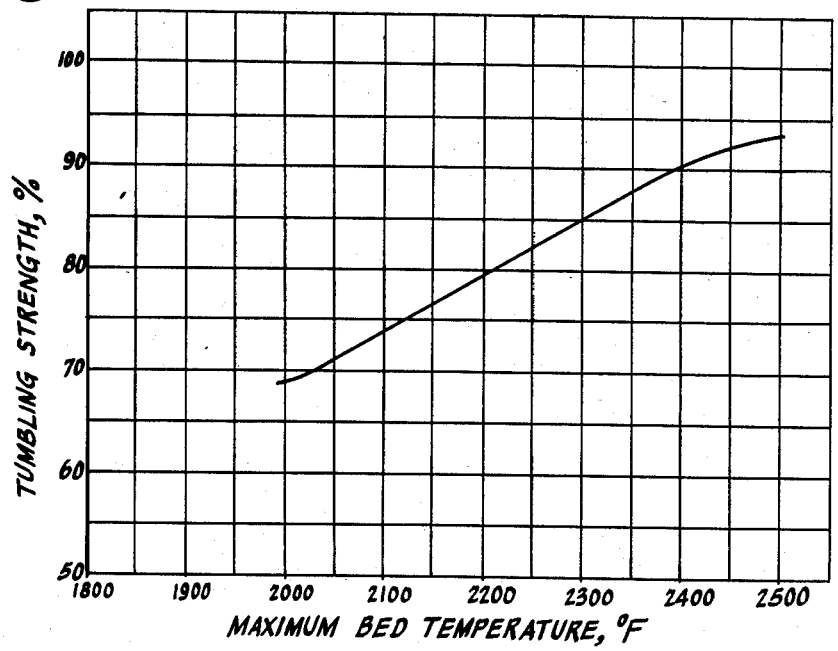
Figure 2:
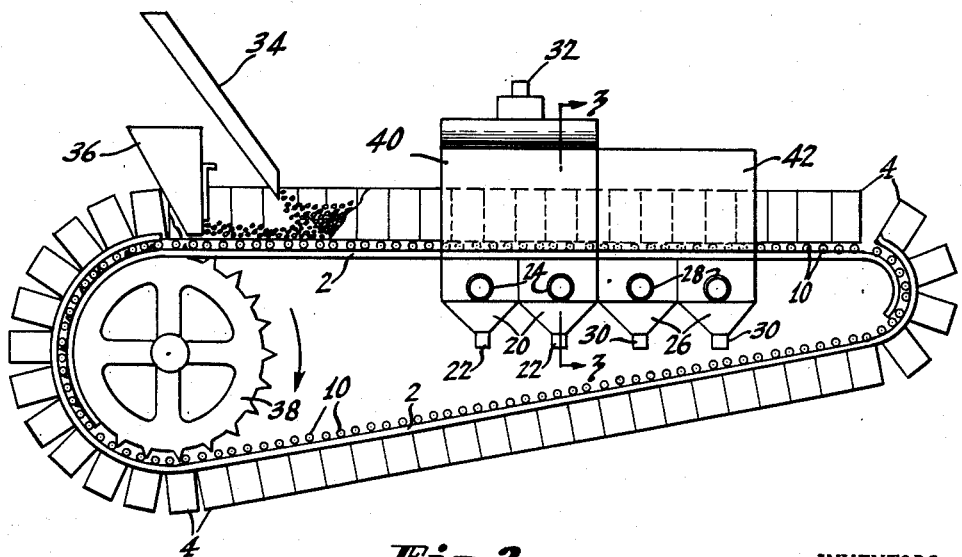
FIGURE 2 is a schematic representation of an apparatus having a non-agitated grate-type carrier with a calcining zone and a cooling zone.

In these drawings a continuous grate is made up of a plurality of pallets, 4, forming an endless train and supported on rails, 2. Lump phosphate which forms the underhearth layer is added through hopper 36, while phosphate feed is placed on top of the underhearth layer using hopper 34. The pallets may range in size from about 15 x 24 inches to about 3 x 8 feet. Metal side plates, 6, bolted to the pallets, 4, permit the grate to carry a phosphate bed of about 18 to 24 inches deep. The cast grate bars, 8, are held in the bottom of the pallets by single pins, 9, while the slots for the passage of gas between the grate bars, 8, are about ¼ of an inch wide. Each of the pallets is supported by four casters, 10, two on each side. The casters, 10, are attached to pickup rods 12. A tooth sprocket, 38, connected to a varidrive, engages the pickup rods, 12, and lifts the pallets to the top or forward track. The sprocket, 38, imparts a pushing action on the pallet as it disengages from the sprocket, and this pallet in turn pushes the rest of the train. Normally, they will not be connected or hinged to each other. While the pallets are passing through the drying-calcining zone, 40, and the cooling zone, 42, a required gas seal is provided over the windboxes, 20 and 26, as illustrated in section 3—3. The seal is provided by a Teflon strip, 16, in contact with pallet seal plate, 14. The Teflon strip, 16, is held in place by a seal support plate, 18, and by a wall of windbox 20. Heat is supplied by passing a hot gas downward through opening 32 of the drying-calcining zone, 40, and through the layer of briquettes on the grate bars, 8. The gas then flows between the space of the grate bars, 8, and into windboxes 20. The main current of hot air is removed through duct 24 for reheating, while fines are removed through lower vents 22.

When the heated briquettes pass into the cooling section, ambient air is forced downwardly through the phosphate bed and through grate bars 8 into windboxes 26. The main current of cooling air is expelled through duct 28 for recycle to the calcining hood, while fines are removed through lower vents 30.

The phosphate shale treated by the present method contains about 22% to 32% $P_2O_5$ in the form of calcium phosphate along with silica, iron oxide, and 2 to 4% of shale oil. Additionally, other organic matter and clay are present with small quantities of chromium oxide and vanadium oxide. This phosphate shale is crushed in a hammer mill into particulate form, and these particles are screened into fines and coarse fractions. The fines fraction of the shale, which passes through a 6 mm. mesh sieve, is sent to an agglomeration step. In this operation the fines fraction is subject to either briquetting or pelletizing by compressing it in the presence of water. However, any conventional briquetting or pelletizing process may be employed to agglomerate the shale fines.

The coarse shale fraction previously separated, ranging in size from ¼ to 3 inches, is termed phosphate lump and is employed in the formation of an underhearth layer on the calciner; excess phosphate lump can also be used as part of the green phosphate feed which is placed on top of the underhearth layer. The bed which is calcined is made up of an underhearth layer, which rests directly on the continuous grate, and an overlay of phosphate agglomerate. The depth of this underhearth layer is generally maintained at about 3 to 12 inches, which constitutes at least 16% of the bed, and is made up of screened phosphate lump having a particle size of about ¼ to 3 inches in diameter. Calcined product may be employed as the underhearth layer in lieu of phosphate lump when the feed comprises only phosphate agglomerates. However, the use of phosphate lump is preferable in that maximum production per unit of grate area is achieved.

The agglomerated feed which is to be calcined is carried on top of the underhearth layer. This feed consists of a mixture of briquettes, obtained from the agglomeration step, and a previously separated coarse fraction of phosphate shale. The endless grate carrying the underhearth layer and the overlay thereupon slowly move these layers into the drying and calcining section, and then finally into the cooling section. The speed of the grate is regulated so that the retention time during the calcining operation is maintained between about 15 to about 25 minutes. During this step, hot gas at a temperature of about 2100° F. to 2300° F. is passed downwardly through the layers in the drying and calcining zone at a rate of about 0.43 to about 0.53 pound mol/min./ft.$^2$ of grate.

It is preferred that the heating gas contain oxygen in order to burn the shale oil contained in the feed and thereby reduce the heating requirements of the calciner. Non-oxygen containing gases may be employed for heating but are not as desirable since these merely vaporize the shale oil without burning it. These hot gases raise the temperature of the material being calcined to at least about 2250° F. The temperature of the material will exceed slightly the temperature of the gas, because combustion of the shale oil within the bed contributes its heat to the calciner.

The calcined phosphate is cooled in the cooling zone by means of ambient air so that the average temperature of the product is low enough to permit it to be handled on rubber conveyors. Generally this temperature is about 250 to 450° F. After passing through the cooling section, the calcined particles are spilled and recovered.

The resultant calcined phosphate product comprises a feed which has been freed of volatiles such as shale oil, $CO_2$, $H_2O$, and the like. This calcination results in lowering the original weight of the ore by about 5 to 10%, and leaves the other ingredients substantially unchanged.

In the operation of the continuous grate calciner, an underhearth layer is required in order to obtain a product which has more uniform tumbling strength, for any particular calcining time employed. This is necessary because calcination through the bed is not entirely uniform. At the top of the bed, where the hot gases initially impinge and penetrate to heat the bed, excellent calcination takes place and results in calcined products having high tumbling strengths. In contrast, calcination takes place under less favorable conditions at the bottom of the bed and results in products having tumbling strengths which are below those obtained at the top of the bed. As a result, a random mixture of phosphate lump and briquettes cannot be calcined to give a product having a high, uniform tumbling strength.

For this reason, an underhearth layer of phosphate lump is employed, since its calcined product inherently yields higher tumbling strength than corresponding calcined briquettes. The feed briquettes which are used in the upper layer, above the underhearth layer, therefore are calcined under conditions which yield high tumbling strengths. This is further demonstrated in Example 2, hereinafter described. In this regard, the following comparative data illustrate the effect of an underhearth layer on product quality.

| Calcining Time, Minutes | 25 | 20 |
|---|---|---|
| | Percent Loss on Tumbling | Percent Loss on Tumbling |
| With No Underhearth | Range 7-24 | Range 7-24 |
| With 4½″ of Underhearth [1] | 8-15 | 7-16 |

[1] Calculated on the assumption that the tumbling strength of the underhearth layer is 85%.

The underhearth layer also reduces maintenance costs on the grate bars by keeping them at a cooler temperature than would be obtained without the underhearth layer.

The employment of a non-agitated perforate carrier for calcination of the phosphate briquettes in the present process has resulted in obtaining a calcined phosphate furnace feed having an unexpected increase in strength, coupled with extremely small amounts of fines in the calcined product. The superiority of the resulting calcined phosphate for use in a phosphate furnace, when compared with calcined phosphate produced in a rotary kiln, is shown by the following typical comparative data:

| Property, Percent | Grate Calciner Product | Rotary Kiln Product |
|---|---|---|
| Loss on Tumbling | 11.0 | 17.0 |
| Fines (−6 m.) Content | 2.6 | 12-15 |
| Ignition Loss | 0.37 | 0.45 |

These results clearly show an improvement in the tumbling strength of the calcined particles produced by the present process as compared with the rotary kiln product. However, in addition to this unexpected increase in strength, it is noted that the fines content of the product of the non-agitated calciner is only 2.6% compared with the 12 to 15% fines present in the product from the rotating kiln.

The low fines content obtained by the instant process makes it unnecessary to screen the calcined product before it is proportioned to the furnace. As a result, substantially no part of the calcined product of the present process need be recycled to the briquetting or pelletizing operation for additional agglomeration, thereby eliminating a recycle load on both the briquetting step and on the calcining operation.

The unscreened nodule produced on a continuous non-perforated carrier also contains a higher percentage of the larger screen fractions than does the screened nodule from the rotary kiln. This latter product contains about 30% plus one inch (+1″) material compared to about 79% plus one inch (+1″) material produced by the instant calcining operation.

The immediate result of obtaining a large nodule plus a drastic reduction in the fines content of the present product is improved phosphorus furnace operation when using this calcined phosphate as the furnace burden. More specifically, the improvement in furnace operation involves less severe and less frequent load fluctuations and smoother all-around furnace operation. In addition, $P_4$ loss in the slag when employing the large nodule feed is about 52% lower than experienced with the rotary kiln nodule. A similar reduction of $P_2O_5$ in the slag is obtained with the large nodule as compared with the nodule produced by the rotary kiln process.

Other benefits also derived from using a calciner having a non-agitated, non-perforated carrier are obtained because of the diminished dust loss. The dust loss is reduced from about 10% of the dry feed in the rotary kiln, to well below 1% of the dry feed in the present process. In addition, an improved plant appearance and cleaner and safer working conditions are obtained in the kiln area.

The present process has a material efficiency which is much higher, being about 93%, than that of the rotary kilns, which is about 83%. Accordingly, the present calcining operation reduces the ore requirements by about 11%. Furthermore, due to the lack of recycle of calcined fines, the instant process will convert over 90% of the dry feed to furnaceable phosphate, whereas the rotary kilns will only convert about 72% of the dry feed to furnaceable phosphate.

Another advantage of the present process is the more efficient utilization of heat derived from the combustion of the shale oil which is present in the phosphate shale feed. In rotary kiln calcination, this shale oil does not contribute a significant amount of heat because it burns in the gas stream above the bed of calcining material. In the present process, the heat from the combustibles is liberated progressively from the top to the bottom of the bed and thereby is effectively used for heating the lower portion of the bed. Because the combustion heat is released in intimate contact within the bed, the heat can be effectively absorbed in the lower section of the bed, and temperature penetration downward into the bed is faster than if all the heat is supplied by the inlet calcining gas. As a result, a lower inlet gas heat input and temperature are required which reduce fuel cost for operating the calciner.

Another advantage which is obtained by using the present calcining process is the elimination of a low-temperature drying period for the green briquette feed. In the normal rotating kiln process, a drying period of approximately 6 minutes is required to dry out the green briquettes before tumbling. This is necessary to prevent the green agglomerates from spalling or degrading into fines upon shock heating at calcining temperatures. It has been determined that the elimination of the drying period does not seriously reduce the average tumbling strength of the calcined agglomerate product when a calcining time of about 15 to 25 minutes is used in the non-agitated perforate carrier-type calciner.

Another unexpected advantage is that briquettes containing shale concentrates can be calcined by the present process but cannot be efficiently calcined in rotary kilns. Shale concentrates are formed by crushing a low grade ore containing small amounts of phosphate embedded in the shale. The crushed product is then treated to a flotation step and the phosphate nodules separated from the residual shale. These phosphate concentrates are then treated to a pelletizing or briquetting operation using water as the binder. These briquettes, containing phosphate concentrates, are then calcined and used as phosphate furnace feeds.

The use of shale concentrates is necessary in the foreseeable future in order to beneficiate the phosphate ores, to reduce mining cost, and to extend phosphate reserves. In the pilot tests that were conducted in the field, it was found that briquettes containing concentrates cannot be efficiently calcined in rotary kilns even if the briquettes are partially dried before calcination. The present process, in contrast, successfully calcines these shale concentrate-containing briquettes, without even requiring a partial drying operation. Furthermore, the use of concentrates in the briquettes does not change the requirements of the grate area of the calciner.

EXAMPLE 1

A continuous grate calciner of the type illustrated in FIGURE 1, and having pallets 15 inches wide and 2 feet long, was employed to calcine a bed of phosphate briquettes 18 inches deep. An underhearth layer of lump phosphate, having a depth of 4.5 inches, was used as the lower section of the bed. The bed was calcined for 21.3 minutes at a temperature of 2235° F. with the gas velocity in the calcining zone at 0.47 pound mol/min./ft.² of grate. The calcined phosphate briquettes were found to have a tumbling strength of 85.4% and an ignition loss of 0.31% (dry basis). Tumbling strength of the underhearth layer was 88.8% and the ignition loss was 1.18%. A material balance of the system is given in Table I.

Table I
[Phosphate material balance—Basis, dry feed]

| Feed | Pounds | Percent of Input |
|---|---|---|
| Lump | 2,249 | 24.0 |
| Briquette | 7,108 | 76.0 |
| Total Input | 9,357 | 100.0 |
| Output: | | |
| Spill | 8,427 | 90.1 |
| Windbox Fines | 99 | 1.1 |
| Stack Fines | 7 | 0.1 |
| Ignition Loss [1] | 580 | 6.2 |
| Total Accounted for | 9,113 | 97.5 |
| Unaccounted for | 244 | 2.5 |
| Total | 9,357 | 100.0 |
| Material Efficiency (Spill and Windbox Fines) | | 91.2 |

[1] Calculated from ignition loss content in feed and spill.

Other runs which were similarly conducted on a non-agitated grate at varying temperatures and calcining times are listed in Table II. The conditions of operations and the calcining strength of the resultant products also are listed in Table II.

Table II

| Test run | 1 | 2 | 3 | 4 | 5 | 6 |
|---|---|---|---|---|---|---|
| Briquette Calcining Temp., °F | 2,270 | 2,230 | 2,350 | 2,400 | 2,330 | 2,380 |
| Calcining Time, Minutes | 25 | 15 | 25 | 20 | 20 | 15 |
| Total Bed Depth, Inches | 18 | 18 | 18 | 18 | 18 | 18 |
| Tumbling Strength of Calcined Briquettes | 85 | 83 | 87 | 92 | 90 | 89 |
| Gas Velocity in Calcining Zone, Lb. mol/min./ft.$^2$ of Grate | 0.5 | 0.5 | 0.5 | 0.5 | 0.5 | 0.5 |

EXAMPLE 2

Phosphate briquettes were calcined on a non-agitated grate calciner in a bed 18 inches deep. The bed was heated for 25 minutes at a calcining temperature of 2260° F. The bed was heated by gas passed through the bed at 0.50 pound mol/min./ft.$^2$ of grate. The temperatures reached by the phosphate briquettes at various depths in the bed were determined using thermocouples. After the calcination time elapsed, the calcined briquettes were cooled and tested for tumbling strength. The temperatures which were reached at the various depths of the bed and the tumbling strengths of the briquettes calcined at those depths are given in Table III.

Table III

| Top ¼ of Bed | | 2nd ¼ of Bed | | 3rd ¼ of Bed | | Bottom ¼ of Bed | |
|---|---|---|---|---|---|---|---|
| Temp., °F | T.S.,[1] Percent | Temp., °F | T.S., Percent | Temp., °F | T.S., Percent | Temp., °F | T.S., Percent |
| 2,500 | 91 | 2,400 | 88 | 2,150 | 82 | 2,020 | 73 |

[1] Tumbling strength.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. The method of producing a phosphate agglomerate having a high structural strength which comprises placing a crushed phosphate lump having a particle size of about ¼ to about 3 inches in diameter on a non-agitated perforate carrier to form an underhearth layer, placing an overlay of agglomerate phosphate feed on said underhearth layer to form a feed bed, said agglomerate phosphate feed being formed by the agglomeration of crushed phosphate ore containing minor amounts of shale oil and capable of passing through a 6 mm. screen, maintaining said underhearth layer in proportions of at least about 16% of the total feed bed depth, passing said feed bed through a calcining zone, passing a heated gas through said feed bed in said calcining zone and heating said agglomerates to temperatures between about 2250 to 2500° F., maintaining said feed bed in the calcining zone for from about 15 to 25 minutes, passing the resulting calcining phosphate into a cooling zone and recovering the calcined product.

2. Process of claim 1 wherein said heating gas contains oxygen.

3. Process of claim 1 wherein said heating gas is inert to the phosphate feed material.

4. Process of claim 1 wherein said heating gas is passed through the calcining zone between about 0.43 to 0.53 pound mol/min./ft.$^2$ of carrier.

5. Process of claim 1 wherein said underhearth layer comprises previously calcined phosphate agglomerate.

6. The method of producing a phosphate agglomerate having a high structural strength which comprises crushing a phosphate ore containing 2 to 4% shale oil, screening the crushed ore into a fines fraction which passes through a 6 mm. screen, and into a coarse fraction having a particle size of about ¼ to about 3 inches in diameter, treating said fines fraction to an agglomeration step to form agglomerates, placing a portion of said coarse fraction on a non-agitated perforate carrier to form an underhearth layer, placing an overlay of said agglomerates on said underhearth layer to form a feed bed, maintaining said underhearth layer in proportions of at least about 16% of the total feed bed depth, passing said feed bed through a calcining zone, passing a heating gas through said feed bed in said calcining zone and heating said agglomerates to temperatures between about 2250 to 2500° F., maintaining said feed bed in the calcining zone for from about 15 to 25 minutes, passing the resulting calcined phosphate into a cooling zone, and recovering the calcined product.

References Cited in the file of this patent
UNITED STATES PATENTS

| | | |
|---|---|---|
| 2,174,066 | Ahlmann | Sept. 26, 1939 |
| 2,776,828 | Marcellus | Jan. 8, 1957 |
| 2,900,179 | Kaufmann | Aug. 18, 1959 |
| 2,945,688 | Pajenkamp et al. | July 19, 1960 |